No. 896,195. PATENTED AUG. 18, 1908.
F. H. BOGART.
UNIVERSAL JOINT.
APPLICATION FILED AUG. 12, 1907.

2 SHEETS—SHEET 1.

Witnesses:
H. L. Sprague
R. M. Mowry

Inventor,
Fred H. Bogart,
by Chapin Lee
Attorneys.

No. 896,195. PATENTED AUG. 18, 1908.
F. H. BOGART.
UNIVERSAL JOINT.
APPLICATION FILED AUG. 12, 1907.

2 SHEETS—SHEET 2.

Witnesses:
H. L. Sprague
R. M. Mowry

Inventor:
Fred H. Bogart,
by Chapin & Co
Attorneys.

UNITED STATES PATENT OFFICE.

FRED H. BOGART, OF HARTFORD, CONNECTICUT, ASSIGNOR TO HARTFORD AUTOMOBILE PARTS COMPANY, OF HARTFORD, CONNECTICUT, A CORPORATION OF CONNECTICUT

UNIVERSAL JOINT.

No. 896,195.     Specification of Letters Patent.     Patented Aug. 18, 1908.

Application filed August 12, 1907. Serial No. 388,269.

*To all whom it may concern:*

Be it known that I, FRED H. BOGART, a citizen of the United States of America, residing at Hartford, in the county of Hartford and State of Connecticut, have invented new and useful Improvements in Universal Joints, of which the following is a specification.

This invention relates to the construction of universal joints, the object thereof being to provide a construction which is simple and strong and easily machined and assembled, and it is in the nature of an improvement on the joint for which Letters Patent of the United States were issued to me on September 4, 1906 numbered 830,203.

The invention is clearly illustrated in the accompanying drawings, in which,—

Figure 1:
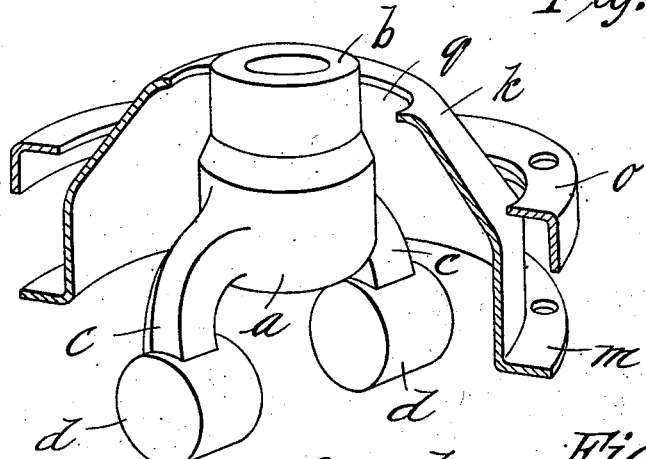
Figure 2:
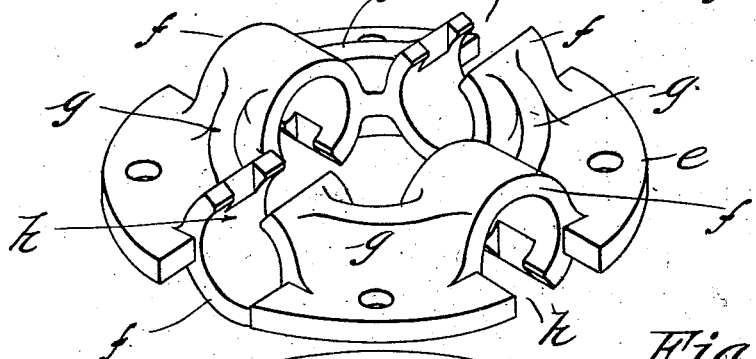
Figure 3:
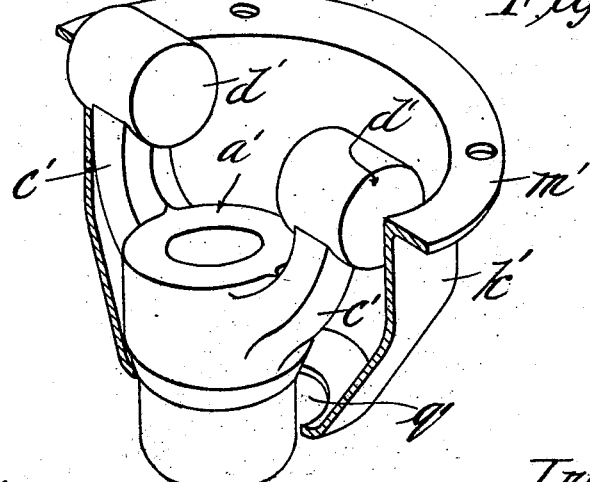
Figure 4:
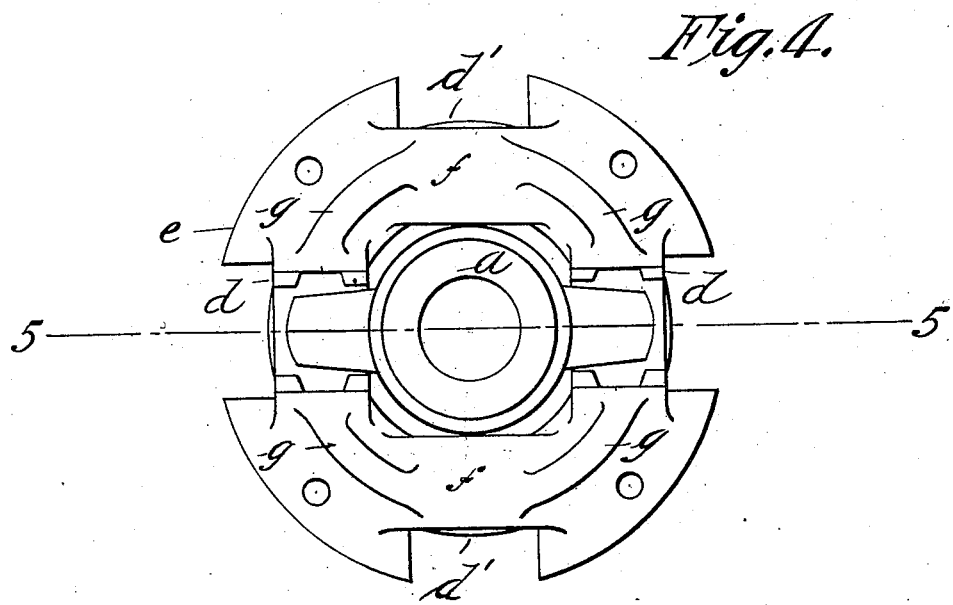
Figure 5:
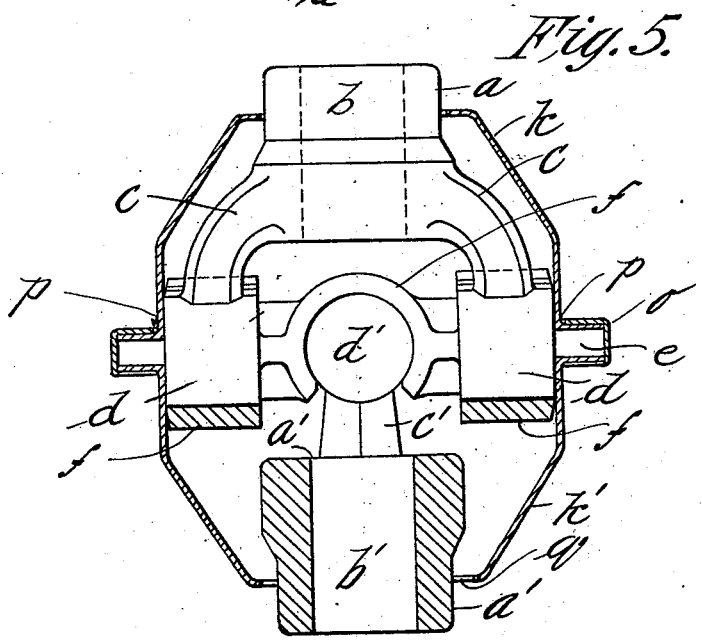

Figure 1 is a perspective view of one element of the joint, one part of the inclosing casing therefor being shown in section, as is also the locking ring. Fig. 2 is a perspective view of a circular plate having seats in opposite sides thereof for the forked end of the driving and driven elements of the joint, and Fig. 3 is a view similar to Fig. 1 showing the other element of the fork, the other part of the casing being shown in section, these three views taken together showing the entire construction with their parts in separated relation. Fig. 4 is a plan view of the bearing plate shown in Fig. 2, and of one of the elements of the fork in position on the plate. Fig. 5 is a sectional view in the plane of line 5—5, Fig. 4 showing clearly the relation of the two elements of the joint to the bearing-plate, also showing the inclosing casing in position on the joint.

Referring to these drawings, $a$, Fig. 1, is one element of the joint and it consists of the hub-part $b$ provided with the forked arms $c$ springing from opposite sides thereof and extending downward beyond the end of the hub, the extremity of each arm having the cylindrical part $d$ thereon, which parts have a common axis. The opposite member, shown in Fig. 3, is in all respects like the member $a$, and for purposes of reference the parts thereof are indicated by the same letters with prime numerals. Either one of these elements $a$ or $a^1$ may be the driving element, these parts being secured respectively to a driving and a driven shaft by keys, or in any desired manner.

The cylindrical portions $d$ and $d^1$ of the two elements $a$ and $a^1$ of the joint are rotatably supported in the same plane with their forks at right angles one to the other, by means of an annular bearing-plate $e$, shown clearly in Fig. 2. Preferably, this plate is forged, with the cylindrical bosses $f$ which are to constitute the bearings for the forks, left solid, the centers of these bosses on the plate lying in the central plane of the latter, this being clearly shown in Fig. 3, as well as Fig. 2, and on either side of the plate a circular web $g$ is formed extending between each of the bearing bosses $f$ whereby the latter are securely braced against strains applied thereto in the plane of rotation of the plate $e$.

The cylindrical bearing bosses $f$ are bored out to receive the cylindrical parts $d$ and $d^1$ of the elements $a$, $a^1$. Each pair of oppositely located bearing bosses is cut through diametrically of the plate $e$, as at $h$, Fig. 2,— one pair on one side and one on the other side of the plate,—the cutaway parts in the bearing bosses being of sufficient width to allow each of the elements $a$, $a^1$ to oscillate through the proper arc. It will be observed that the plate $e$ is annular, and means are thereby provided whereby in assembling, each fork can be located astride of one of the bearing bosses $f$ and then moved axially of the latter to bring each of the cylindrical parts $d$ or $d^1$ to a proper seat in their respective bearing bosses $f$. It will be noticed that the border of the plate $e$ extends beyond the outer end of the bearing bosses $f$, and by referring to Fig. 5 it will be seen that the periphery of the plate thus constitutes a clamp against which the two halves $k$ and $k^1$ of the casing abut, each of the casing parts being provided with a flange $m$ and $m^1$ seated on the plate $e$, the latter and the flanges $m$, $m^1$ being bored to receive locking screws (not shown), as is also the metal ring $o$ which is L-shaped in cross section. This ring $o$ serves a double purpose of making a relatively tight joint for the flanged edges of the casing where they join the plate $e$, and also serves to back up the casing at the point $p$ (Fig. 5) which, at this point, serves to prevent either of the elements $a$, $a^1$ from having any movement axially in the bearing bosses $f$. Of course there is very little tendency to such endwise movement of these elements $a$, $a^1$ in their bearings, but whatever tendency there is, is overcome by fitting the two parts of the casing closely to the outer ends of the parts $d$, $d^1$. Where the hubs $b$, $b^1$ of the two joint elements extend through the opposite ends of the casing, the latter are cut away, as at $q$, to permit freedom of oscillation of each of the elements $a$, $a^1$ of the joint in their respective rectangularly disposed planes.

From the foregoing description, it is clear that the joint ! rein described is of simple and strong construction, easily machined, and very quickly assembled, there being no fitting of any of the parts in assembling, and the torsional strain, when the joint is running, is applied directly to the bearings in the plate $e$ which are integral with the plate itself, the ribs $g$ on either side of the plate extending between the bearings, serving to strongly brace the bearings and stiffen the plate, permitting the latter to be made of relatively light weight. The joint is so constructed also that it can be readily inspected by simply unfastening the two parts of the casing and sliding them back upon their respective shafts, without interfering with the adjustment of the parts of the joint in any way.

Attention is called to the fact that there are no parts in the make-up of the joint that have to be secured together to hold the parts in their proper operative relation, and therefore nothing that in running can loosen up in a way to prevent its perfectly smooth action under all conditions.

What I claim, is:—

1. A universal joint comprising an annular bearing-plate having diametrically opposed bearings thereon, the ends of which are open, two forked members provided with hubs, the axes of which extend through the axis of said plate, each member having a swinging movement in two of said bearings on opposite sides of said plate, the planes of oscillation of said members being at right angles one to the other, and a two-part casing to inclose the bearing-plate, and removably secured thereto.

2. A universal joint having in combination an annular bearing plate provided with cylindrically shaped radially disposed bearings in the plane thereof, members provided with hubs and oppositely disposed arms terminating in cylindrical bearing elements for engaging the bearings in said bearing-plate, a two part casing provided with a flanged rim secured to the plate, and a clamping ring secured to the casing.

3. A universal joint having in combination an annular bearing plate provided with cylindrically shaped radially disposed bearings in the plane thereof, members provided with hubs and oppositely disposed arms terminating in cylindrical bearing elements for engaging the bearings in said bearing-plate, a two-part casing provided with a flanged rim secured to the plate, and a clamping ring secured to the casing, said ring being rectangular in cross section and engaging the periphery of the annular bearing-plate and casing.

FRED H. BOGART.

Witnesses:
K. I. CLEMONS,
WM. H. CHAPIN.